United States Patent [19]
Potchen

[11] 3,796,460
[45] Mar. 12, 1974

[54] BICYCLE SADDLE MOUNT

[76] Inventor: Peter F. Potchen, 9654 Idlewood Dr., Brooklyn, Ohio 44144

[22] Filed: Mar. 29, 1971

[21] Appl. No.: 128,936

[52] U.S. Cl. ............................................. 297/211
[51] Int. Cl. ................................................ B62j 1/02
[58] Field of Search .......... 297/211, 203, 195, 208, 297/209; 248/402, 403

[56] References Cited
UNITED STATES PATENTS

| | | | |
|---|---|---|---|
| 975,827 | 11/1910 | Busch | 248/403 X |
| 1,151,164 | 8/1915 | Davis | 248/403 X |
| 1,133,389 | 3/1915 | Mesinger | 297/211 |
| 1,306,622 | 6/1919 | Persons | 297/211 |
| 1,453,326 | 5/1923 | Stenrop, Jr. | 297/211 X |
| 1,961,145 | 6/1934 | Harley et al. | 297/211 X |
| 2,467,676 | 4/1949 | Labine | 297/211 |

Primary Examiner—James T. McCall
Attorney, Agent, or Firm—Cain and Lobo

[57] ABSTRACT

A saddle mount for bicycles and the like in which the frame and saddle post have close sliding engagement with each other and reciprocate relative to each other when the saddle is in use, spring seats are provided on the frame and saddle with the former being adjustable, a U-bolt extends through the spring seats on the frame and is secured to the saddle spring seats and a spring is disposed about each side of the U-bolt and co-acts between a spring seat on the frame and the corresponding spring seat on the saddle.

7 Claims, 4 Drawing Figures

PATENTED MAR 12 1974 3,796,460

BICYCLE SADDLE MOUNT

This invention relates to improvements in Bicycle Saddle Mount. The principle objects of this invention are:

First, to provide a mount for the saddle of a bicycle motorcycle or the like which is attachable to the upright tubular frame member of the bicycle frame to permit vertical, yieldably supported reciprocation of a saddle post in the frame member to cushion the support of the saddle.

Second, to provide a saddle mount which is attachable at different levels on a frame member to adjust the height of the saddle and provide a cushion support in addition to the cushion or spring incorporated in the saddle.

Third, to provide a saddle mount which is attachable to a wide variety of saddle structures and which prevents twisting of the saddle on the bicycle frame.

Fourth, to provide a saddle mount which is simple and inexpensive to manufacture and install yet which is rugged and long lived in use.

Other objects and advantages of the invention will be apparent from a consideration of the following description and claims. The drawings, of which there is one sheet, illustrate a highly practical form of the saddle mount of the invention.

FIG. 1 is a fragmentary, cross sectional view taken along the plane of the line 4—4 in FIG. 1.

Figure 1:
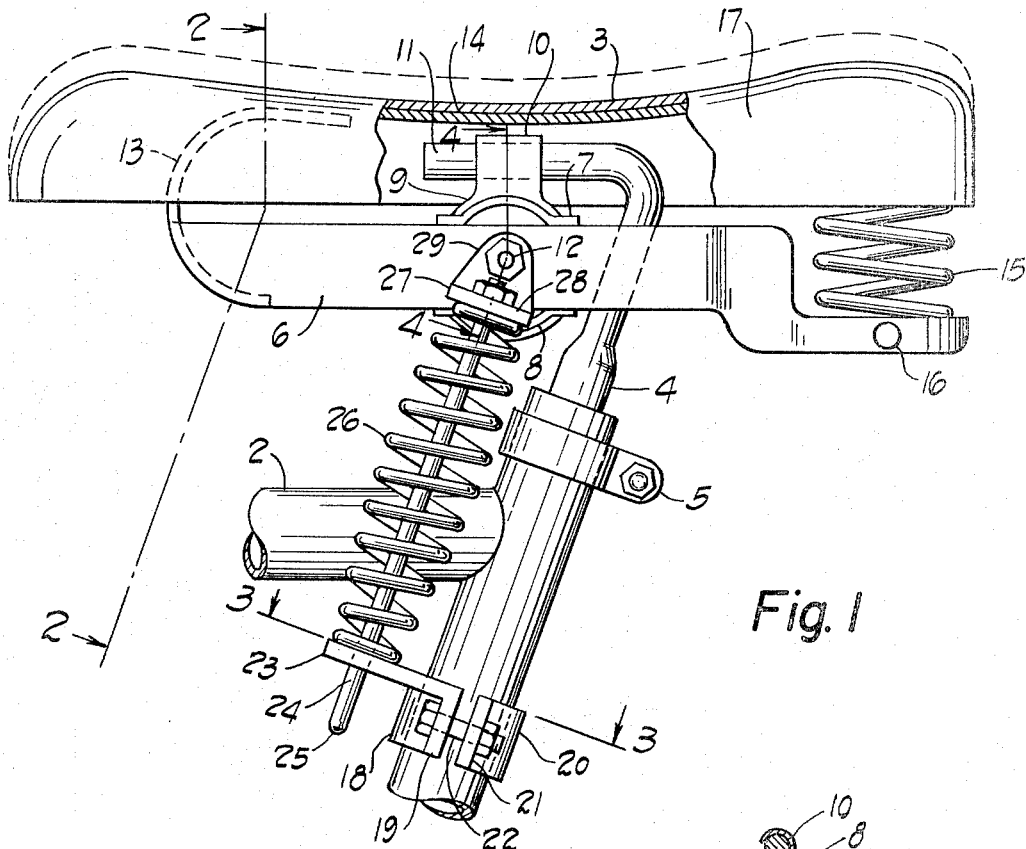
FIG. 1 is a fragmentary, side elevational view of a bicycle frame and a saddle mounted thereon with the mounting structure of the invention.
Figure 2:
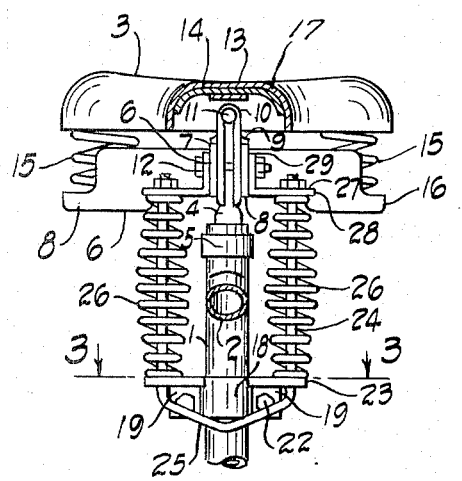
FIG. 2 is a fragmentary, cross sectional view taken along the plane of the line 2—2 in FIG. 1.
Figure 4:
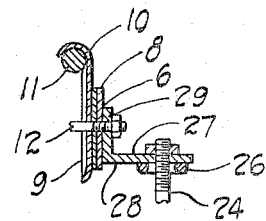
Figure 3:
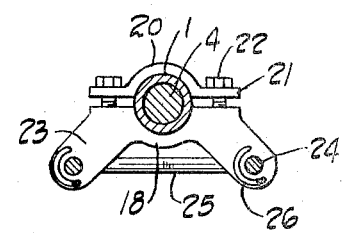
FIG. 3 is a fragmentary, cross sectional view taken along the plane of the line 3—3 in FIG. 2.

Most bicycles have a frame which includes an upright tubular frame member 1 open at the top. Men's model of the bicycle will further have a horizontal top longitudinal frame member 2. The saddle 3 of the bicycle is adjustably mounted on the frame by means of a seat post 4 telescopically fitting within the upper end of the upright frame member 1 and adjustably clamped in place by a clamp ring 5. Various forms of saddle construction are utilized but all include a saddle base member such as the horizontally arranged yoke shaped base member 6. The arms of the yoke fit within flanges 7 on circular clamps 8 and the clamps 8 coact with and are angularly adjustably clamped to circular ears 9 on the U-clamp 10. The clamp 10 embraces and grips a neck 11 on the post 4. A bolt 12 adjustably clamps the parts in place. The front end of the yoke base 6 has an upwardly projecting spring finger 13 that supports the front of the saddle backing plate 14. Coil springs 15 rivited to the rear ends of the yoke 6 as at 16 support the rear of the saddle backing. The backing plate 14 is covered with leather 17.

As stated, there are a variety of saddle structures to which the saddle mount of the invention may be applied. The mount consists of a lower spring supporting bracket having a front part 18 with a semi-cylindrical rearwardly concave center and laterally projecting side flanges 19. A coacting second part 20 of the lower spring bracket has a forwardly concave smei-cylindrical center with laterally projecting ears 21 opposed to the side flanges 19. Bolts 22 selectively clamp the tow parts of the bracket to the tubular frame member 1 in the desired position along the frame member. The front part of the frame member has forwardly and laterally angled ears 23 which are drilled to pass the arms 24 of a U-bolt 25 and which constitute lower spring seats for the lower ends of coiled cushion springs 26.

The upper ends of the side arms 24 of the U-bolts are secured to angle brackets 27 having laterally projecting arms 28 and upwardly projecting arms 29. The arms 28 and 29 are of different length to permit adjustment of the spacing of the vertical arms by reversing the positions of the arms 28 and 29. The arms 29 are rigidly secured to the side arms of the saddle base yoke member by the same bolt 12 that clamps the saddle base to the neck of the post. The springs 26 are telescoped around the arms 24 of the U-bolt and bear against the laterally projecting arms 28 as upper spring seats.

When the saddle mount of the invention is attached to the bicycle frame and saddle the clamp ring 5 or other clamping device for the saddle post 4 is loosened or removed completely and the post 4 is lubricated to slide freely in the upright tubular frame member 1. It will be apparent that impact forces applied to the saddle and the saddle base member 6 will force the angle brackets 27 and the upper spring seats downwardly against the cushioning support of the springs 26 with the U-bolt 25 sliding in the ears 23 of the lower spring support bracket. This cushioning action is in addition to the cushioning support of the existing springs 15 built into the saddle. The triangular arrangement of the side arms 24 of the U-bolt and the post 4 in the upright frame member prevent rotation of the saddle about the axis of the post 4, and as has already been noted, the height of the saddle can be adjusted by adjusting the position of the lower spring seat bracket 16 on the upright frame member.

What is claimed is:

1. A saddle mount for a bicycle having a longitudinally extending frame, including a substantially upright tubular member, and a saddle having a saddle post adapted to be mounted in telescopic relationship with said tubular member, said saddle mount comprising a lower support bracket detachably mounted on said tubular member and having lower spring seat means spaced transversely of and from said tubular member with a said spring seat means on each side of said tubular member, upper spring seat means on said saddle with a said upper seat means in alignment with each said lower spring seat means, and spring means acting between each pair of said upper and lower seat means, respectively, said post and tubular member having a close, sliding engagement with and being reciprocable relative to each other.

2. The saddle mount according to claim 1 in which said tubular member is a hollow, tubular member and said saddle post is disposed therein.

3. The saddle mount according to claim 2 in which said tubular member has an end in which said post is disposed, and said bracket is adjustable on said tubular member, longitudinally relative to said end, to control the relative telescoping of said tubular member and said post.

4. The saddle mount according to claim 2 in which said bracket has ear means extending laterally from said tubular member and comprising said lower seat means, respectively, an aperture in said ear means, U-bolt means having a base and two arms, each said arm having an end extending through one of said apertures respectively with said base being more remote from said saddle than said ear means, said ends of said arms extending to said upper seat means, respectively, and being secured to said saddle, and a said spring being disposed about each said arm.

5. The saddle mount according to claim 4 in which said apertures in said ear means are disposed forwardly of said tubular frame member.

6. The saddle mount according to claim 4 including a pair of L-shaped brackets each having legs of different length and an aperture in each leg of a size to receive a said U-bolt arm, each L-shaped said brackets being, detachably and interchangeably mounted on said seat with a predetermined one of said legs being used to mount said L-shaped bracket in said seat and the other said leg comprising a said upper seat means.

7. A saddle mount for a bicycle having a longitudinally extending frame, including a substantially upright tubular member, and a saddle having a saddle post adapted to be mounted in telescopic relationships with said tubular member, said saddle mount comprising lower spring seat means, upper spring seat means carried by said saddle and spring means acting between said upper and lower seat means carried solely by said tubular member, said post and tubular member having a close, sliding engagement with and being reciprocable relative to each other.

* * * * *